United States Patent
Yang et al.

(10) Patent No.: US 9,566,648 B2
(45) Date of Patent: Feb. 14, 2017

(54) LATHE CONTROL SYSTEM

(71) Applicants: Ming-Lu Yang, New Taipei (TW);
Tian-En Zhang, Shenzhen (CN);
Ya-Dong Zhang, Shenzhen (CN);
Jian-Shi Jia, Shenzhen (CN);
Yang-Mao Peng, Shenzhen (CN);
Wei-Chuan Zhang, Shenzhen (CN);
Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(72) Inventors: Ming-Lu Yang, New Taipei (TW);
Tian-En Zhang, Shenzhen (CN);
Ya-Dong Zhang, Shenzhen (CN);
Jian-Shi Jia, Shenzhen (CN);
Yang-Mao Peng, Shenzhen (CN);
Wei-Chuan Zhang, Shenzhen (CN);
Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 526 days.

(21) Appl. No.: 13/705,545

(22) Filed: Dec. 5, 2012

(65) Prior Publication Data
US 2014/0020522 A1    Jan. 23, 2014

(30) Foreign Application Priority Data

Jul. 20, 2012    (CN) .................. 2012 1 0252855

(51) Int. Cl.
*B23B 7/00* (2006.01)
*B23Q 1/62* (2006.01)
*B23B 5/36* (2006.01)

(52) U.S. Cl.
CPC . *B23B 7/00* (2013.01); *B23B 5/36* (2013.01); *B23Q 1/626* (2013.01);
(Continued)

(58) Field of Classification Search
CPC ............... Y10T 82/2502; B23Q 1/626; B23Q 2230/004; B23Q 2727/00; B23B 5/36; B23B 7/00
See application file for complete search history.

(56) References Cited

U.S. PATENT DOCUMENTS 3,918,348 A  *  11/1975  Runft ........................ 409/195
4,149,235 A  *   4/1979  Froyd ................... G05B 19/05
                                                    700/169

(Continued)

FOREIGN PATENT DOCUMENTS

CN    101300097 A    11/2008
CN    201997771 U    10/2011
(Continued)

*Primary Examiner* — Sara Addisu
(74) *Attorney, Agent, or Firm* — Zhigang Ma

(57) ABSTRACT

A lathe control system used for three dimensional curved surface machining includes an input module, a control module, a work table, a feeding module, a first sliding module, a second sliding module, and a cutter. The control module is electrically connected with the input module, the feeding module, the first sliding module, and the second sliding module. The first sliding module drives the feeding module to move along a first direction. The second sliding (Continued)

module drives the feeding module to move along a second direction perpendicular to the first direction. The cutter is positioned on the feeding module. The feeding module is capable of driving the cutter to move back and forth along a third direction under the control of the control module. The third direction is perpendicular to first and second direction.

7 Claims, 4 Drawing Sheets

(52) U.S. Cl.
CPC .... *B23Q 2230/004* (2013.01); *B23Q 2727/00* (2013.01); *Y10T 82/2502* (2015.01)

(56) References Cited

U.S. PATENT DOCUMENTS

| | | | |
|---|---|---|---|
| 4,229,804 A * | 10/1980 | Kobayashi et al. | 711/115 |
| 4,262,336 A * | 4/1981 | Pritchard | G05B 19/4141 |
| | | | 318/573 |
| 4,272,818 A * | 6/1981 | McDaniel | G05B 19/351 |
| | | | 318/603 |
| 4,310,878 A * | 1/1982 | Hyatt | B60R 16/0373 |
| | | | 318/608 |
| 4,387,327 A * | 6/1983 | Kralowetz et al. | 318/573 |
| 4,396,976 A * | 8/1983 | Hyatt | B60R 16/0373 |
| | | | 700/1 |
| 5,485,771 A | 1/1996 | Brennan et al. | |
| 7,669,508 B2 * | 3/2010 | Gardiner et al. | 82/118 |
| 7,677,146 B2 * | 3/2010 | Gardiner et al. | 82/70.2 |
| 2004/0003689 A1 | 1/2004 | Bryan | |
| 2006/0270540 A1 * | 11/2006 | Takayama et al. | 483/41 |
| 2008/0166190 A1 | 7/2008 | Gardiner et al. | |

FOREIGN PATENT DOCUMENTS

| | | |
|---|---|---|
| CN | 101508025 B | 12/2011 |
| CN | 101898325 B | 5/2012 |
| EP | 0849038 A2 | 6/1998 |
| EP | 1925397 A1 | 5/2008 |
| EP | 2070616 A1 | 6/2009 |
| JP | H1043906 A | 2/1998 |
| JP | H11309602 A | 11/1999 |
| JP | 2004130468 A | 4/2004 |
| JP | 2005279835 A | 10/2005 |
| JP | 2007075915 A | 3/2007 |
| JP | 2008221427 A | 9/2008 |
| JP | 2008246594 A | 10/2008 |
| JP | 5237702 B2 | 7/2013 |

* cited by examiner

LATHE CONTROL SYSTEM

CROSS-REFERENCE TO RELATED APPLICATIONS

This application claims all benefits accruing under 35 U.S.C. §119 from China Patent Application No. 201210252855.4, filed on Jul. 20, 2012, in the China Intellectual Property Office, the disclosure of which is incorporated herein by reference. The application is also related to co-pending applications entitled, "MACHINE TOOL WITH UNINTERRUPTED CUTTING" Ser. No. 13/705,843; "FEEDING DEVICE AND MACHINE TOOL USING THE SAME" Ser. No. 13/705,788; "METHOD FOR MACHINING CURVED SURFACE USING LATHE" Ser. No. 13/705,777; "LATHE FOR MACHINING CURVED SURFACES" Ser. No. 13/705,713; "FEEDING DEVICE AND MACHINE TOOL USING THE SAME" Ser. No. 13/705,611; "LATHE WITH TWO CROSS BEAMS" Ser. No. 13/705,585; "WORKPIECE HAVING NON-ROTARY SURFACE MACHINED BY LATHE" Ser. No. 13/705,478; "LATHE FOR MACHINING CURVED SURFACES" Ser. No. 13/705,383.

BACKGROUND

1. Technical Field

The present disclosure generally relates to lathe control systems, and particularly, to a lathe control system for machining curved surfaces.

2. Description of the Related Art

In the related manufacturing field, a milling cutter with different cutting edges is used for machining curved surfaces. Some tracks are formed on the milled surface of the workpiece because of intermitted contact and interrupted milling by the milling cutter. A polish step needs to be added for a better appearance. When a lathe is used for machining curved surfaces, only a two dimensional curved surface with rotary feature can be machined because the movement of a cutter of the lathe is limited.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
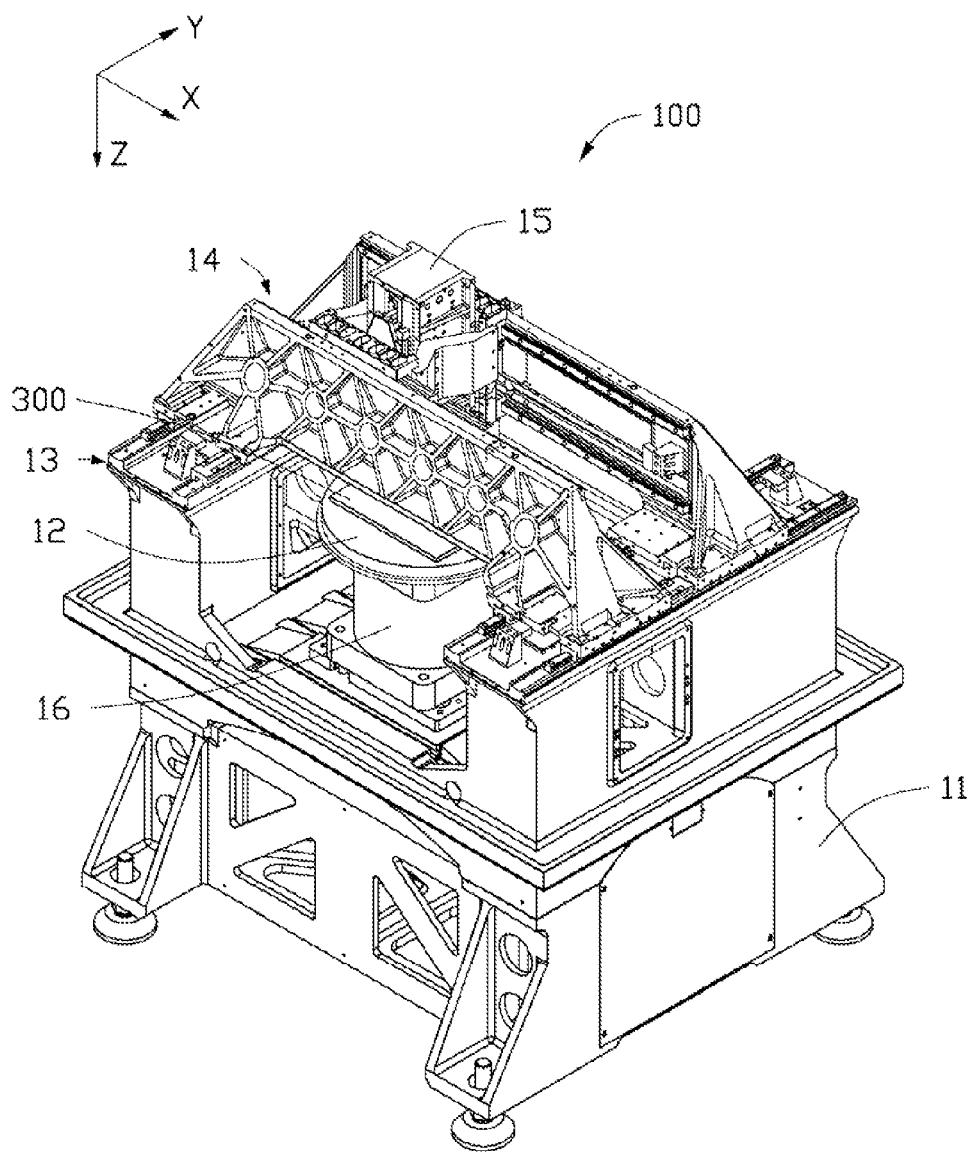
FIG. 1 is an isometric view of an embodiment of a lathe under a control of a lathe control system.
Figure 2:
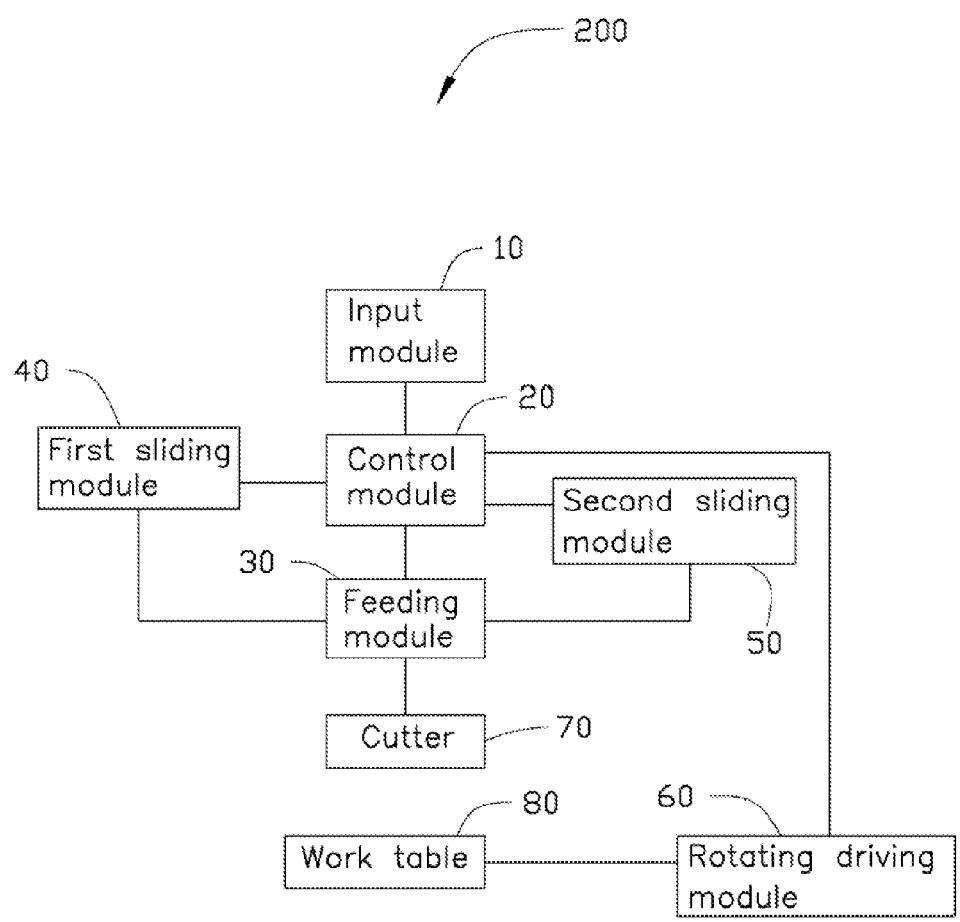
FIG. 2 is a schematic diagram of one embodiment of the lathe control system.

FIGS. 1 and 2 show an embodiment of a lathe 100 under control of a lathe control system 200. The lathe 100 is used for machining a curved surface on a workpiece 300 in a single operation. The lathe 100 includes an input module 10, a control module 20 electrically connected with the input module 10, a machine support 11, a work table 12, a first sliding module 13, a second sliding module 14, a feeding module 15, and a rotating driving module 16. The first sliding module 13 is positioned on the machine support 11. The work table 12 is supported by the machine support 11 below the first sliding module 13 and holds the workpiece 300 in place. The second sliding module 14 is slidably positioned on the first sliding module 13. A cutter (not shown) is positioned on the feeding module 15. The control module 20 is electrically connected with the first sliding module 13, the second sliding module 14, and a feeding module 15, respectively. The rotating driving module 16 rotates the work table 12 and the workpiece 300. The first sliding module 13 is configured to drive the cutter to move along the Y-axis (the first direction). The second sliding module 14 is configured to drive the cutter to move along the X-axis (the second direction). The feeding module 15 is used for driving the cutter to move back and forth along the Z-axis (the third direction) at high speed.

FIG. 2 shows one embodiment of the lathe control system 200. The workpiece 300 has a three dimensional curved surface 301 to be machined. The lathe control system 200 includes the input module 10, the control module 20, a feeding module 30, a first sliding module 40, a second sliding module 50, a rotating driving module 60, a cutter 70, and the work table 80.

The input module 10 is electrically connected with the control module 20. The input module 10 is used for inputting control parameters, such as motion range, velocity for the feeding module 30 moving along the X-axis and Y-axis, frequency, distance for the cutter 70 moving back and forth along the Z-axis, and revolution for the work table 80.

The control module 20 is electrically connected with the feeding module 30, the first sliding module 40, the second sliding module 50, and the rotating drive module 60. The control module 20 is configured to control the feeding module 30, the first sliding module 40, the second sliding module 50, and the rotating driving module 60. The first sliding module 40 is used for driving the feeding module 30 to move along the Y-axis. The second sliding module 50 is used for driving the feeding device 30 to move along the X-axis. The rotating driving module 60 rotates the work table 80 and controls the revolution of the work table 80. The feeding module 30 is configured to drive the cutter 70 to move back and forth along the Z-axis at high speed. In the illustrated embodiment, the frequency of the cutter 70 moving back and forth is from about 400 to about 3200 times per minute. Each of the control parameters is determined by a simulation of machining a desired three dimensional curved surface onto the workpiece 300. The parameters, such as the velocity for the feeding module 30 moving along the X-axis and Y-axis, frequency, distance for the cutter 70 moving back and forth along the Z-axis at high speed, are input in the input module 10. An average surface roughness of the three dimensional curved surface, which is machined under the control of the lathe control system 200, is from about 0.2 micron to about 1.0 micron.

Figure 3:
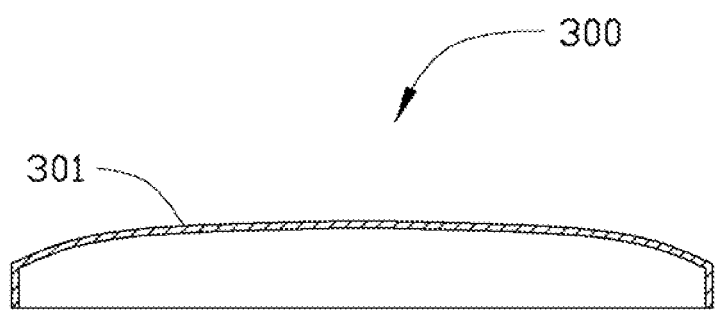
FIG. 3 is a side view of a workpiece machined by the lathe control system shown in FIG. 2.

An example of the lathe control system 200 controlling the machining of the curved surface 301 shown in FIG. 3 includes first inputting the control parameters via the input module 10. The Y-axis coordinate α is a fixed value, the motion range of the feeding module 30 moving along the X-axis is from 0 to path distance β. The velocity v of the feeding module is defined as $v=\beta/t$, wherein t is machining time of the lathe control system 200. The feeding module 30 moves along the X-axis from the start of machining to the completion of machining. A starting position is a point Λ of an edge of the workpiece 300, and the terminal position is a center point Ω of the workpiece 300. The parameters of the frequency is μ, the cutter distance is E for the cutter 70 moving back and forth along the Z-axis, and the revolution is γ of the work table 20. The Y-axis coordinate α, path distance β, velocity ν, machining time t, and frequency μ are fixed values during the machining. The value of the cutter distance ξ is decreased with the motion of the feeding module 30 along the X-axis. In the illustrated embodiment, the revolution γ is about 600 revolutions per minute and the frequency μ is about 2400 times per minute.

Figure 4:
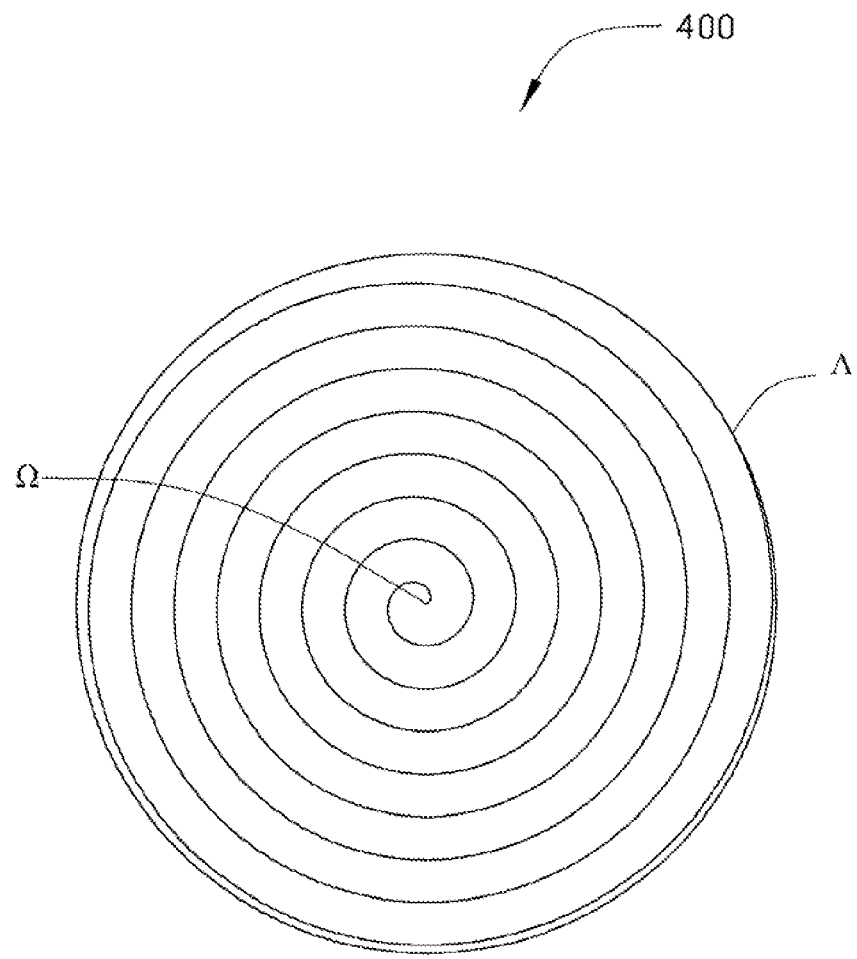
FIG. 4 is a top plan view of a planar cutting path of the cutter machining the workpiece shown in FIG. 3.

FIG. 4 shows the first sliding module 40 driving the feeding module 30 to move along the Y-axis under the control of the control module 20. The feeding module 30 arrives at a preset position after moving the path distance β, which is above the starting position Λ of an edge of the workpiece 300. The second sliding module 50 drives the feeding module 30 to advance along the X-axis at the velocity ν, the rotating driving module 60 drives the work table 60 to rotate at the revolution γ, and the feeding module 30 brings the cutter 70 to move back and forth along the Z-axis at the frequency μ and the cutter distance ξ is decreased under the control of the control module 20.

A planar cutting path of the cutter 70 is spiral. The cutter 70 begins to machine the workpiece 300 at starting position Λ, then moves to the terminal position Ω along the spiral path for machining the three dimensional curved surface 301. In the illustrated embodiment, the average surface roughness of the machined three dimensional curved surface is about 0.5 micron.

In other embodiments, with changes in a relationship between the frequency μ, and the cutter distance ξ of the cutter 70 according to the machining time t, three dimensional curved surfaces with different shapes will be obtained under the control of the lathe control system 200.

In other embodiments, the coordinate of the X-axis may be a fixed value instead of the fixed coordinate of the Y-axis in the illustrated embodiment, so that the feeding module 30 moves along the Y-axis after arriving at a starting position during the machining.

The lathe control system 200 controls the feeding module 30 and the cutter 70 to move along the X-axis or the Y-axis, the rotating driving module 60 rotates the workpiece 300, and the feeding module 30 also drives the cutter 70 to move back and forth along the Z-axis at high speed. Thereby, the cutter 70 moves along a spiral cutting path on the workpiece 300 for high quality appearance. No other process is needed to be performed to the workpiece 300 after it has been machined by the lathe control system 200.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A lathe used for machining a workpiece having three dimensional curved surface, the lathe comprising:
    an input module;
    a control module electrically connected with the input module;
    a work table for fixing the workpiece, and rotated by a rotating driving module electrically connected with the control module;
    a feeding module electrically connected with the control module;
    a first sliding module electrically connected with the control module to drive the feeding module to move along a first direction;
    a second sliding module electrically connected with the control module to drive the feeding module to move along a second direction substantially perpendicular to the first direction; and
    a cutter positioned on the feeding module,
    wherein when the first sliding module drives the feeding module slide along the first direction, or the second sliding module drives the feeding module slide along the second direction, the feeding module controls the cutter move back and forth along a third direction with a fixed frequency to machine the workpiece, a reciprocating distance of a movement of the cutter relative to the workpiece is reduced, the third direction is substantially perpendicular to the first and second direction, the rotating driving module controls the work table to rotate, and a value of a cutter distance for the cutter moving back and forth along the third direction is controlled to be decreased by the feeding module with a motion of the feeding module along the first direction or the second direction, thereby the three dimensional curved surface of the workpiece which has an average surface roughness of about 0.2 micron to about 1.0 micron.

2. The lathe of claim 1, wherein the input module is configured for inputting control parameters, the control module controls according to the control parameters, and the control parameters comprises a motion range and velocity of the feeding module moving along the first direction and the second direction, a revolution of the working table, a frequency, and a distance of the cutter moving back and forth along the third direction.

3. The lathe of claim 1, wherein a planar projection of a motion of the cutter is a spiral.

4. The lathe of claim 1, wherein the revolution of the work table is from about currently amended revolutions per minute to about 800 revolutions per minute.

5. The lathe of claim 1, wherein the frequency of the cutter moving back and forth is from about 400 times per minute to about 3200 times per minute.

6. The lathe of claim 1, wherein the first sliding module is electrically connected with the feeding module.

7. The lathe of claim 1, wherein the average surface roughness of the machined three dimensional curved surface is about 0.5 micron.

* * * * *